United States Patent
Hashimoto et al.

(10) Patent No.: US 6,308,316 B1
(45) Date of Patent: Oct. 23, 2001

(54) APPARATUS FOR ANALYZING OPERATIONS OF PARALLEL PROCESSING SYSTEM

(75) Inventors: Shin Hashimoto, Kawasaki; Reiji Masaki, Shizuoka, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/004,505

(22) Filed: Jan. 8, 1998

Related U.S. Application Data

(63) Continuation of application No. 08/281,997, filed on Jul. 29, 1994, now abandoned.

(30) Foreign Application Priority Data

Nov. 30, 1993 (JP) .................................................. 5-300205

(51) Int. Cl.⁷ .................................................. G06F 9/45
(52) U.S. Cl. .................................................. 717/4; 712/1
(58) Field of Search .................. 714/47; 702/186, 702/117, 82, 123, 114; 717/4, 47, 17; 712/1

(56) References Cited

U.S. PATENT DOCUMENTS

| | | |
|---|---|---|
| 4,775,950 | 10/1988 | Terada et al. . |
| 4,872,121 | 10/1989 | Chan et al. . |
| 5,245,638 | * 9/1993 | Gustafson .............................. 717/47 |
| 5,361,352 | * 11/1994 | Iwassawa et al. ...................... 717/4 |
| 5,437,047 | 7/1995 | Nakamura . |
| 5,442,772 | 8/1995 | Childs et al. . |
| 5,483,468 | 1/1996 | Chen et al. . |
| 5,684,947 | 11/1997 | Horie . |

FOREIGN PATENT DOCUMENTS

| | | |
|---|---|---|
| 59-77565 | 5/1984 | (JP) . |
| 61-16324 | 1/1986 | (JP) . |
| 2-128243 | 5/1990 | (JP) . |
| 3-184138 | 8/1991 | (JP) . |
| 4-62644 | 2/1992 | (JP) . |
| 5-2508 | 1/1993 | (JP) . |
| 5-6344 | 1/1993 | (JP) . |
| 405002508A | * 1/1993 | (JP) . |
| 405081221A | * 4/1993 | (JP) . |
| 5-173994 | 7/1993 | (JP) . |
| 5-227155 | 9/1993 | (JP) . |
| 4052J0339A | * 9/1993 | (JP) . |

* cited by examiner

Primary Examiner—Larry D. Donaghue
(74) Attorney, Agent, or Firm—Staas & Halsey LLP

(57) ABSTRACT

An apparatus analyzes the operations of a parallel processing system. The parallel processing system has a serial processing state, a redundant parallel processing state, and a parallel processing state. The apparatus carries out an interrupt process to provide information about the program executing conditions of the parallel processing system. This apparatus efficiently provides information about parallel processing carried out in a multiprocessor system.

6 Claims, 15 Drawing Sheets

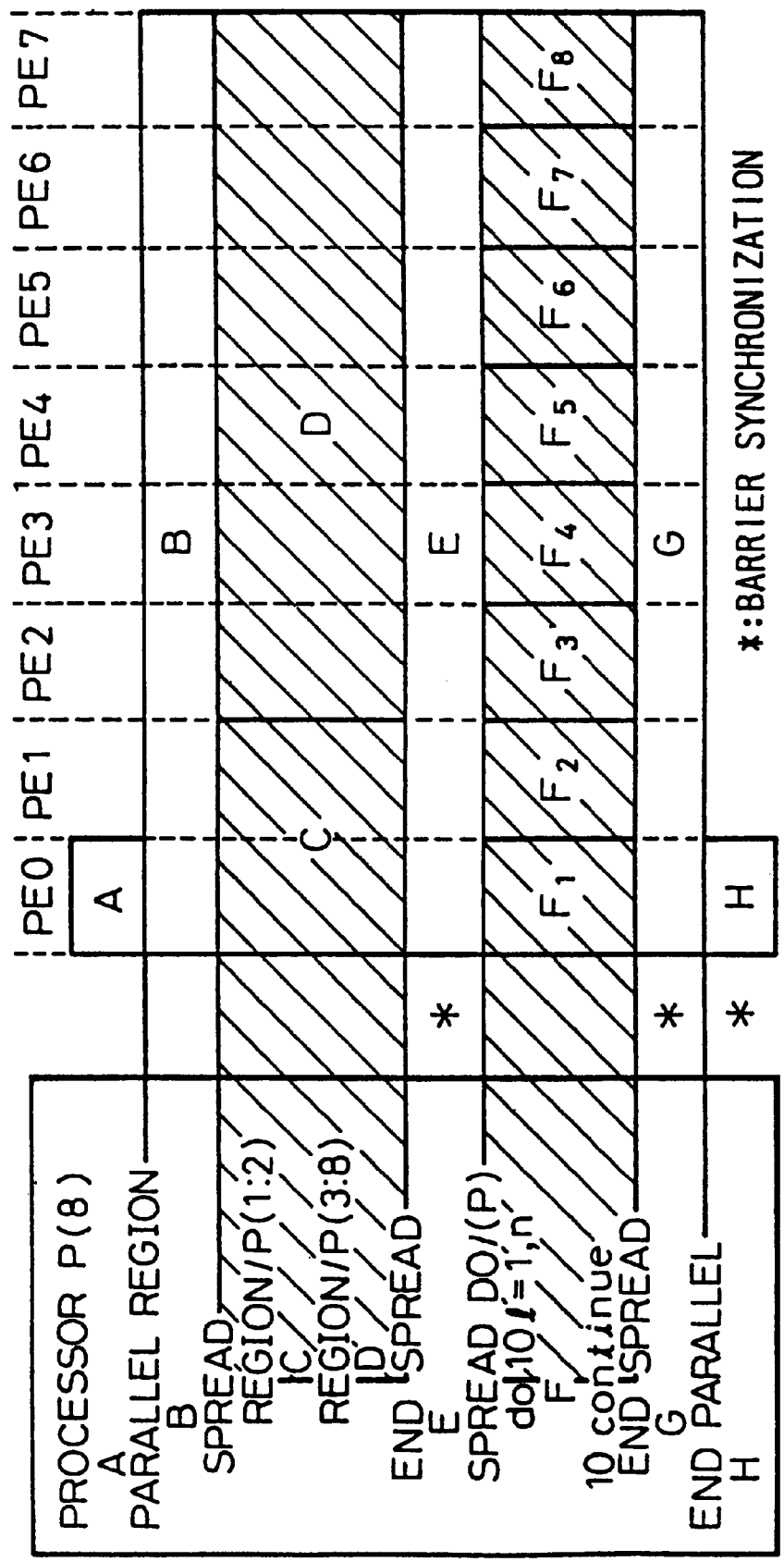

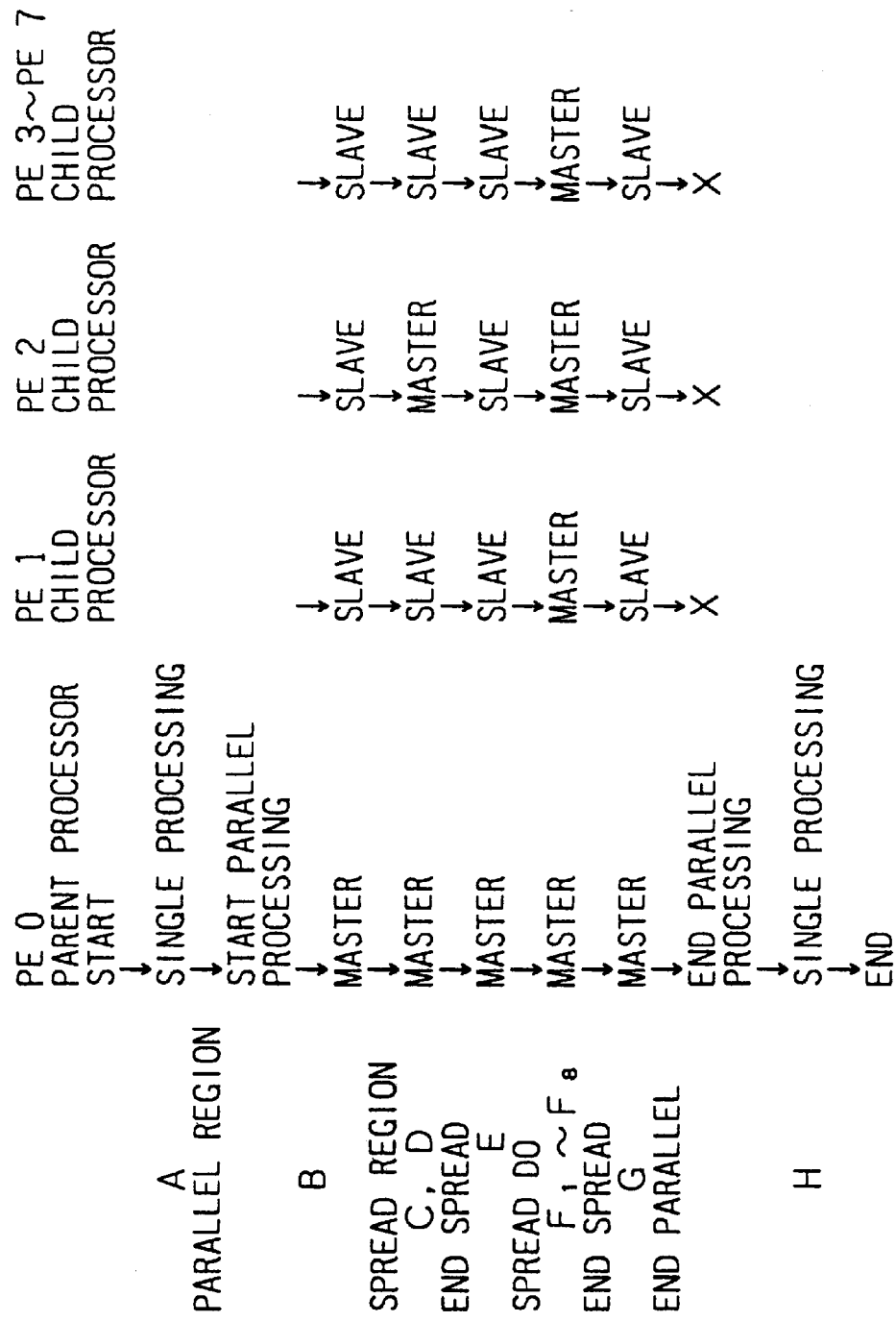

STATE TRANSITION OF PARENT PROCESSOR (PE0)

STATE TRANSITION OF CHILD PROCESSORS (PE1 TO PE7)

Fig.14A

Status : Parallel
Number of Processors : 8

Interval Timer Type : ITIMER_VIRTUAL (cpu)
Interval Timer Value (msec) : 10

Performance Information :
Parallel Information :

| Parallel speed up | Parallelization ration (P) | Parallel to serial speed ratio (β) | Load balance (γ) | Asynchronous transfer ratio (M) | Name |
|---|---|---|---|---|---|
| 6.20297030 | 1.0000000 | 6.31876889 | 0.03929664 | 0.00275229 | dvalu_ |
| 7.53726708 | 1.0000000 | 7.35788114 | 0.00082271 | 0.00082271 | datgen_ |
| 3.81250000 | 1.0000000 | 4.77391304 | 0.07692308 | 0.14102564 | dlux_ |
| 2.00000000 | 1.0000000 | 1.98717949 | 0.00000000 | 0.00000000 | dmvm_ |
| 1.00000000 | 1.0000000 | 1.00000000 | 1.00000000 | 0.00000000 | MAIN_ |
| 1.00000000 | 0.0000000 | 1.00000000 | 0.00000000 | 0.00000000 | dpvalu_ |
| 6.44819985 | 1.00000000 | 6.41030266 | 0.02931776 | 0.00341673 | TOTAL INFORMATION |

Fig.14B

Synthesis Information (Count)

| PM | PMW | PMWW | RM | RMW | RMWW | ALL | AW | AMW | Name |
|---|---|---|---|---|---|---|---|---|---|
| 1010 | 255 | 3 | 6540 | 257 | 18 | 8288 | 1887 | 18 | dvalu |
| 322 | 2 | 2 | 2431 | 2 | 2 | 2644 | 91 | 12 | datgen |
| 16 | 6 | 3 | 78 | 6 | 11 | 131 | 53 | 11 | dlux |
| 11 | 0 | 0 | 22 | 0 | 0 | 89 | 1 | 3 | dmvm |
| 1 | 1 | 0 | 1 | 1 | 0 | 186 | 186 | 0 | MAIN |
| 1 | 0 | 0 | 1 | 0 | 0 | 1 | 0 | 0 | dpvalu |
| 1361 | 264 | 8 | 9073 | 266 | 31 | 11339 | 2218 | 44 | TOTAL COUNT |

Synthesis Information (%)

| PM | PMW | PMWW | RM | RMW | RMWW | ALL | AW | AMW | Name |
|---|---|---|---|---|---|---|---|---|---|
| 74.2 | 18.7 | 0.2 | 72.1 | 2.8 | 0.2 | 73.1 | 16.6 | 0.2 | dvalu |
| 23.7 | 0.1 | 0.1 | 26.8 | 0.0 | 0.0 | 23.3 | 0.8 | 0.1 | datgen |
| 1.2 | 0.4 | 0.2 | 0.9 | 0.1 | 0.1 | 1.2 | 0.5 | 0.1 | dlux |
| 0.8 | 0.0 | 0.0 | 0.2 | 0.0 | 0.0 | 0.8 | 0.0 | 0.0 | dmvm |
| 0.1 | 0.1 | 0.0 | 0.0 | 0.0 | 0.0 | 1.6 | 1.6 | 0.0 | MAIN |
| 0.1 | 0.0 | 0.0 | 0.0 | 0.0 | 0.0 | 0.0 | 0.0 | 0.0 | dpvalu |

APPARATUS FOR ANALYZING OPERATIONS OF PARALLEL PROCESSING SYSTEM

This application is a continuation of application Ser. No. 08/281,997, filed Jul. 29, 1994, now abandoned.

BACKGROUND OF THE INVENTION

1. Field of the Invention

The present invention relates to an apparatus for analyzing the operations of a parallel processing system, and particularly, to an apparatus for providing information about parallel processing carried out in a multiprocessor system.

2. Description of the Related Art

To obtain information about parallel processing carried out in a multiprocessor system, a prior art embeds special instructions in an executable program written in a high-level language such as FORTRAN or C and analyzes the output of the special instructions.

Such embedding of special instructions deteriorates the performance of the multiprocessor system. Accordingly, the instructions are optionally embedded during the compilation of a program.

Information about serial processing is obtainable by interrupting a program at regular intervals and by finding the execution address at each interruption. This technique is not applicable to obtaining information about parallel processing.

The embedding of special instructions in an executable program will provide inaccurate information about parallel processing in a multiprocessor system because the executable program with embedded special instructions differs from an actual executable program having no special instructions. In addition, this technique takes several minutes to several hours to repeat compilation for tuning, to increase the work to obtain information about the parallel processing.

SUMMARY OF THE INVENTION

An object of the present invention is to efficiently provide information about parallel processing in a multiprocessor system.

According to the present invention, there is provided an apparatus for analyzing the operations of a parallel processing system having a serial processing state, a redundant parallel processing state, and a parallel processing state, the apparatus carrying out an interrupt process to obtain information about the program executing conditions of the parallel processing system.

The parallel processing system may have a wait function for synchronization. The wait function for synchronization of the parallel processing system may include a barrier synchronization wait function.

The parallel processing system may have a hardware asynchronous transfer function and employ a language capable of using the hardware asynchronous transfer function. The language may be a high-level language. The high-level language may be an extended FORTRAN language.

The apparatus may calculate a parallelization ratio P as $P = 1 - (N \times J - A)/(R \times (N-1))$; where N is the number of processors, J is the number of program master interrupts, A is the number of all interrupts, and R is the number of region master interrupts. The apparatus may calculate a parallel-to-serial speed ratio $\beta$ as $\beta = ((N-1) \times (R-J))/(A-J) + 1$; where N is the number of processors, R is the number of region master interrupts, J is the number of program master interrupts, and A is the number of all interrupts.

Further, according to the present invention, there is also provided a parallel processing system comprising a plurality of processor elements for carrying out parallel processing; a control unit for specifying the plurality of processor elements to be a serial processing state, a redundant parallel processing state, or a parallel processing state; and a network unit, connected to each of the processor elements and the control unit, for linking the processor elements and the control unit; and an information obtaining unit for carrying out an interrupt process to obtain information about the program executing conditions thereof.

The network unit may comprise a crossbar network. Each of the processor elements may comprise a data transfer unit for transferring data through the network unit, a main storage unit for storing data, a scalar unit for carrying out a scalar calculation, and a vector unit for carrying out a vector calculation. The scalar unit may include an interval timer for carrying out interrupt processing, and a clock for providing interrupt time. The control unit may comprise a general processor for compiling a program read out from a disk unit, a system storage unit for storing system data, and a control processor for controlling the processor elements to actually execute the program.

BRIEF DESCRIPTION OF THE DRAWINGS

The present invention will be more clearly understood from the description of preferred embodiments as set forth below with reference to the accompanying drawings, wherein:

FIG. 10 shows the operations of the parallel processing system of FIG. 9;

FIG. 11 explains the operations of the parallel processing system of FIG. 10;

FIGS. 14A and 14B show examples of outputs provided by the apparatus of the present invention.

DESCRIPTION OF THE PREFERRED EMBODIMENTS

An apparatus (a sampler) for analyzing the operations of a parallel processing system according to an embodiment of the present invention will be explained with reference to the drawings.

Figure 1:
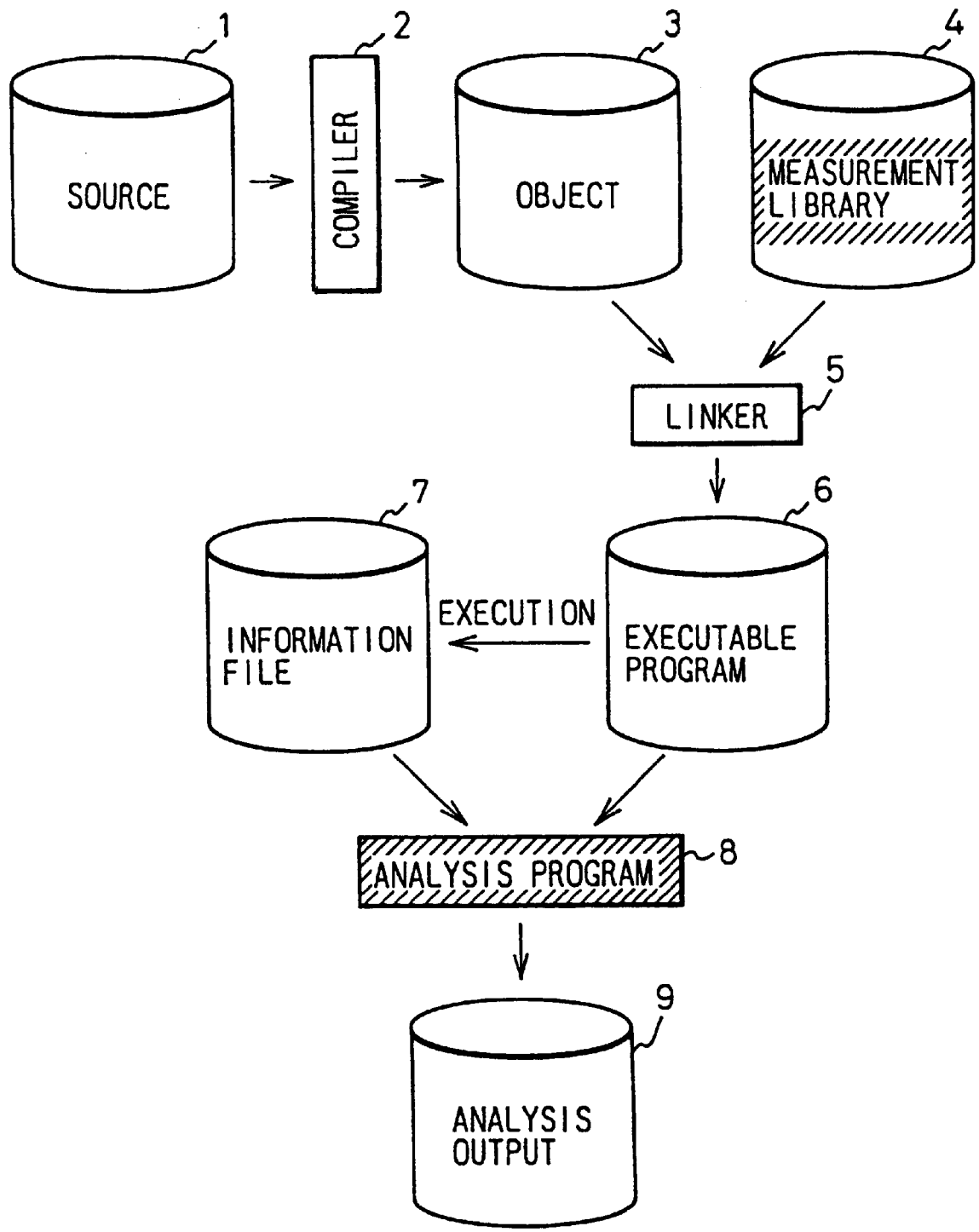
FIG. 1 is a model showing an apparatus for analyzing the operations of a parallel processing system according to an embodiment of the present invention.

FIG. 1 is a block diagram showing the apparatus. The apparatus involves a source program written in, for example, FORTRAN, a compiler 2, an object 3 with compiled codes, a measurement library 4, a linker 5, an executable program 6, an information file 7, an analysis program 8, and an analysis output 9.

The linker 5 inserts the measurement library 4 into the executable program 6. When the program 6 is executed with the proper option, the inserted measurement library 4 is activated to generate the information file 7. When no option is specified, the initialization overhead for determining whether or not the option is specified is very small.

The analysis program 8 analyzes the information file 7 with use of, for example, data (elf-information) contained in the program 6.

The apparatus of this embodiment examines the executing state of the program 6 by use of interrupts based on the interrupt timer function of an OS (operating system). When the number of the interrupts made by the apparatus (sampler) is sufficiently large, the analysis output 9 represents the executing state of the program 6, and therefore, is useful to tune the program 6. If the program 6 involves a cyclic operation and if the period thereof matches an interrupt interval, the apparatus of the present invention will not correctly provide the executing state of the program. In this case, the interrupt interval must be changed.

Figure 2:
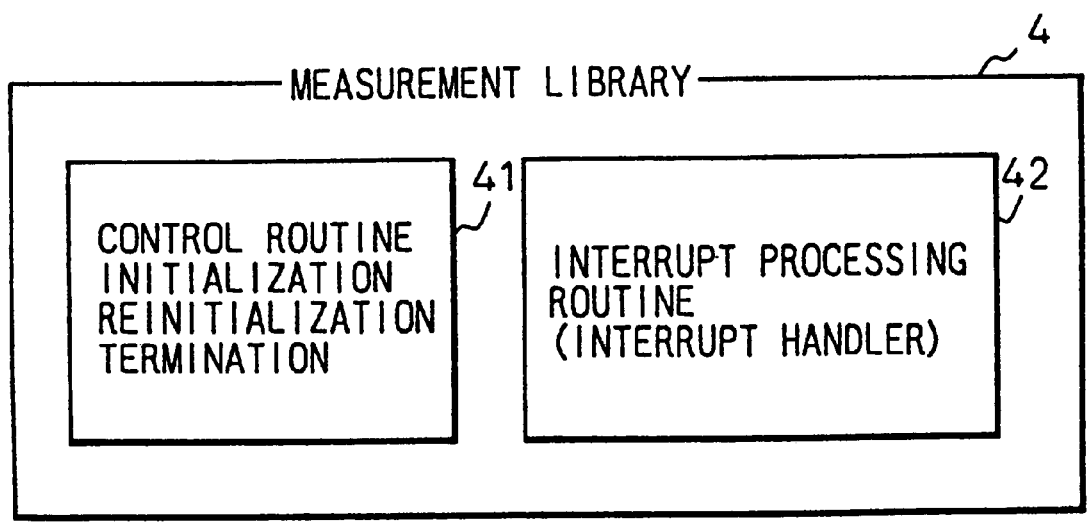
FIG. 2 shows a measurement library of the apparatus of FIG. 1.

FIG. 2 shows the measurement library 4 of the apparatus of FIG. 1.

The measurement library 4 includes a control routine 41 and an interrupt processing routine (an interrupt handler) 42. The control routine 41 has functions of initialization, reinitialization, and termination. The interrupt handler 42 is registered in the OS and is called thereby whenever a timer interrupt occurs.

Figure 3:
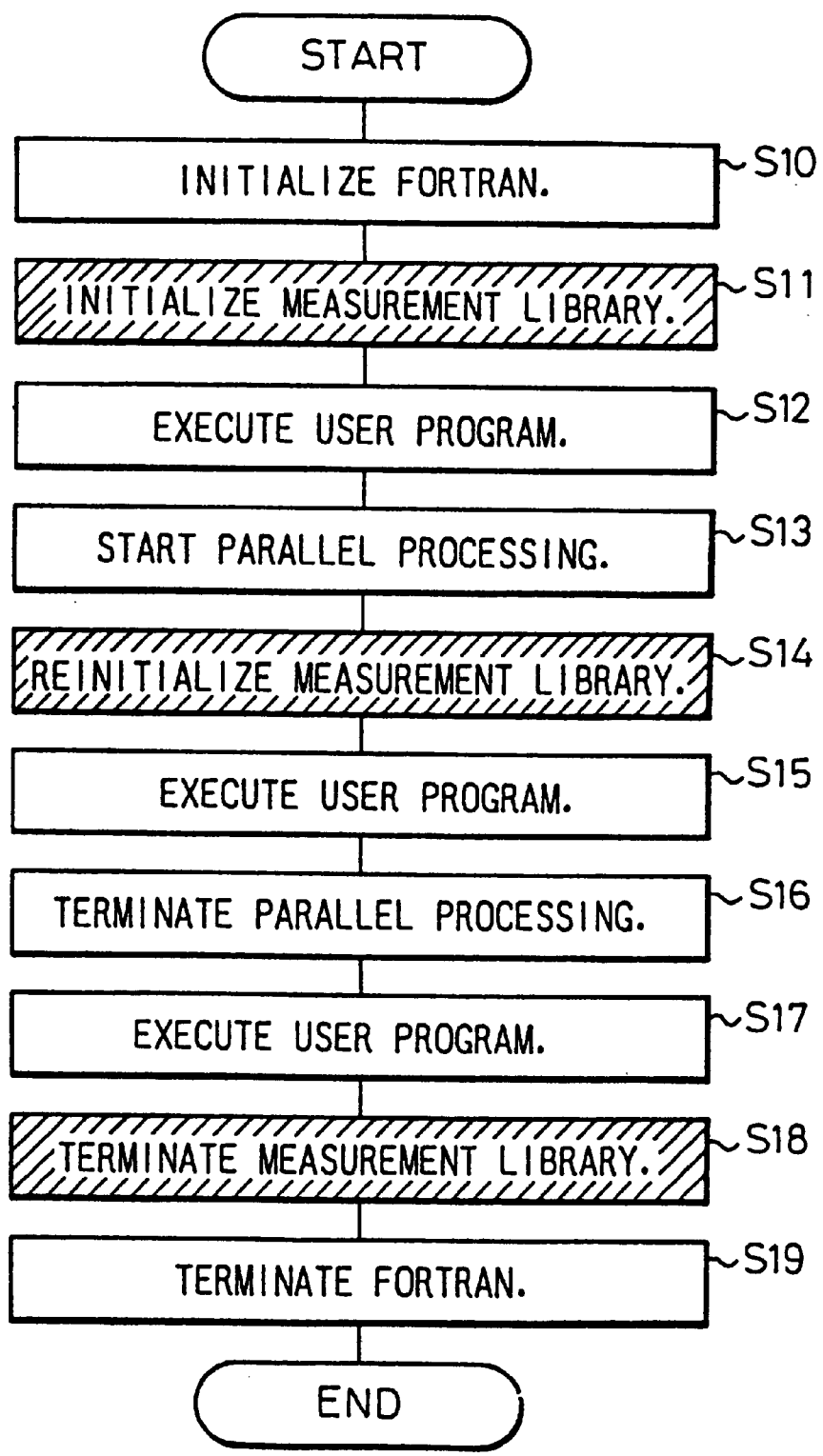
FIG. 3 is a flowchart showing steps of executing a program according to the apparatus of the present invention.

FIG. 3 is a flowchart showing steps of executing the executable program according to the apparatus of the present invention.

Step S10 initializes the program written in, for example, FORTRAN. Step S11 initializes the measurement library as will be explained in detail with reference to FIG. 4. Step S12 starts to execute the program. Step S13 starts parallel processing. Step S14 reinitializes the measurement library as will be explained later in detail with reference to FIG. 5.

Namely, the step S10 initializes the program, and during this period, the step S11 initializes the measurement library. After the step S13 starts parallel processing, the program is executed in a plurality of processors. Child processors, processors other than the parent processor which is operating from the beginning, reinitialize the measurement library in the step S14.

Step S15 executes the program. Step S16 terminates the parallel processing. Step S17 executes the program. Step S18 terminates the measurement library as will be explained later in detail with reference to FIG. 6. Step S19 terminates the FORTRAN to complete the program.

Figure 4:
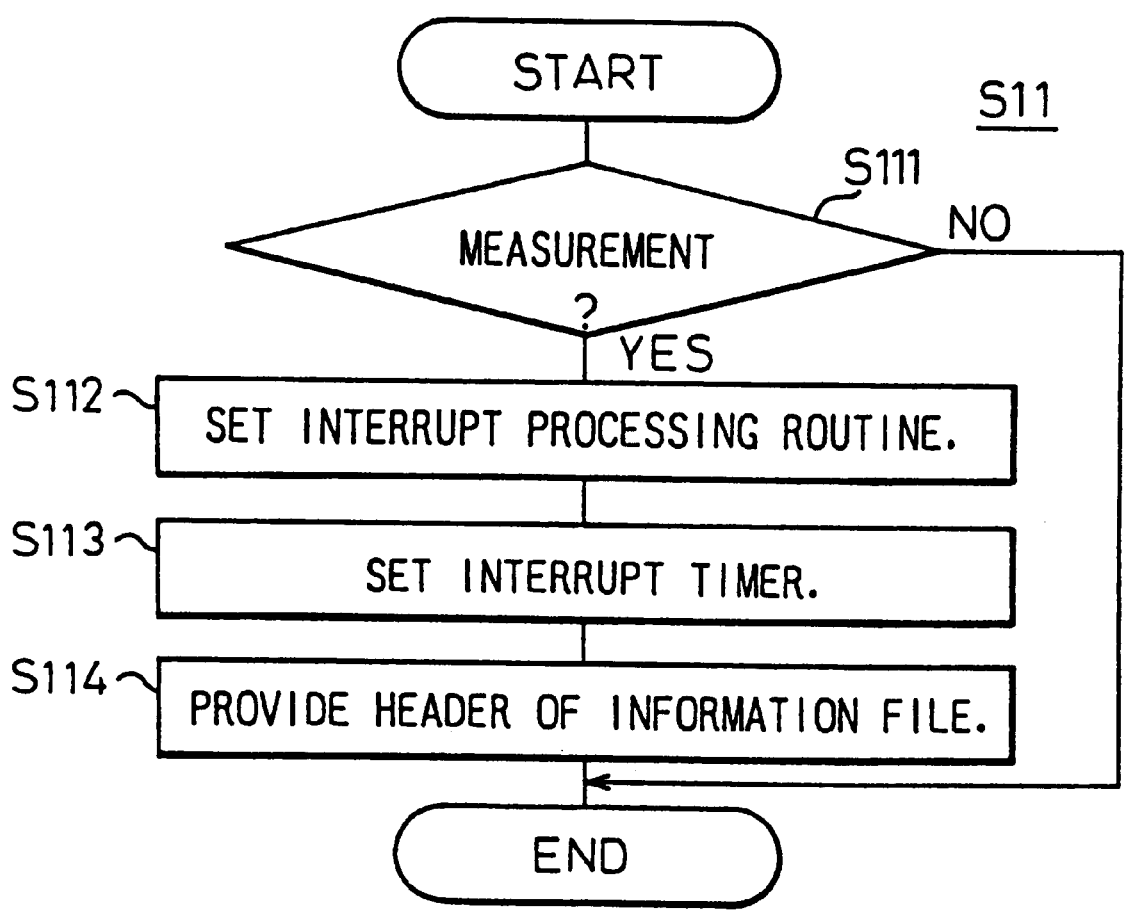
FIG. 4 is a flowchart showing steps of initializing the measurement library of FIG. 3.

FIG. 4 is a flowchart showing the step S11 of initializing the measurement library.

Step S111 determines whether or not measurement must be carried out. If NO, the flow ends, and if YES, step S112 sets the interrupt processing routine. Step S113 sets the interrupt timer. Step S114 provides a header of the information file. When initializing the measurement library, the step S112 registers the interrupt processing routine in the OS, and the step S113 activates the interrupt timer to cause interrupts at regular intervals. The step S114 provides management data about the information file.

The steps of FIG. 4 for initializing the measurement library are carried out only by the parent processor among a plurality of processor elements (PEs). The interrupt timer activated in the step S113 operates at intervals of several milliseconds to several seconds, for example, 10 milliseconds.

Figure 5:
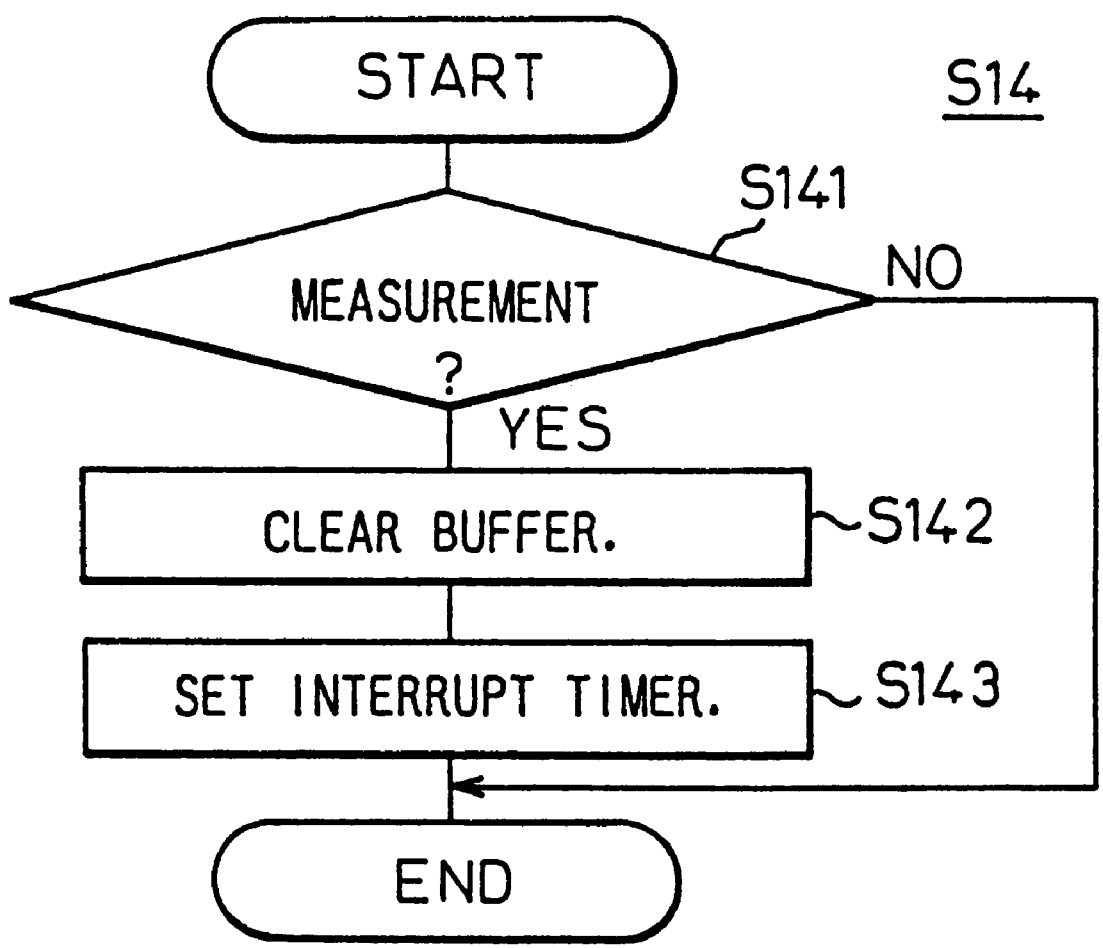
FIG. 5 is a flowchart showing steps of reinitializing the measurement library of FIG. 3.

FIG. 5 is a flowchart showing the step S14 of reinitializing the measurement library.

Step S141 determines whether or not the measurement has been specified. If NO, the flow ends, and if YES, step S142 clears a buffer. Step S143 sets the interrupt timer. Namely, the step S142 invalidates buffered output information and the step S143 activates the interval timer. The steps of FIG. 5 are carried out in the child processors. Similar to the step S113 of FIG. 4, the step S143 sets the interrupt timer at intervals of several milliseconds to several seconds, for example, 10 milliseconds.

Figure 6:
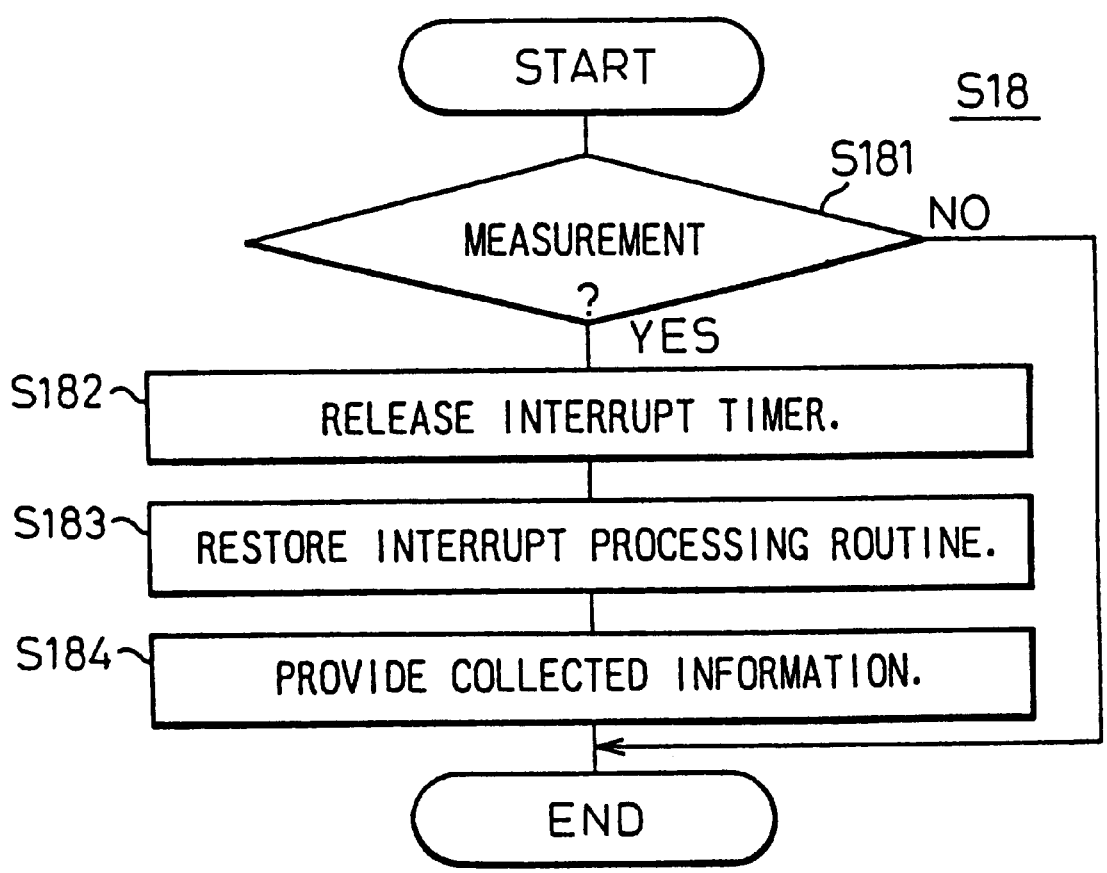
FIG. 6 is a flowchart showing steps of terminating the measurement library of FIG. 3.

FIG. 6 is a flowchart showing the step S18 for terminating the measurement library.

Step S181 determines whether or not the measurement has been specified. If NO, the flow ends, and if YES, step S182 releases the interrupt timer. Step S183 restores the interrupt processing routine. Step S184 provides collected information. Namely, the step S182 stops the interval timer, the step S183 restores the interrupt processing routine, and the step S184 provides buffered information.

Figure 7:
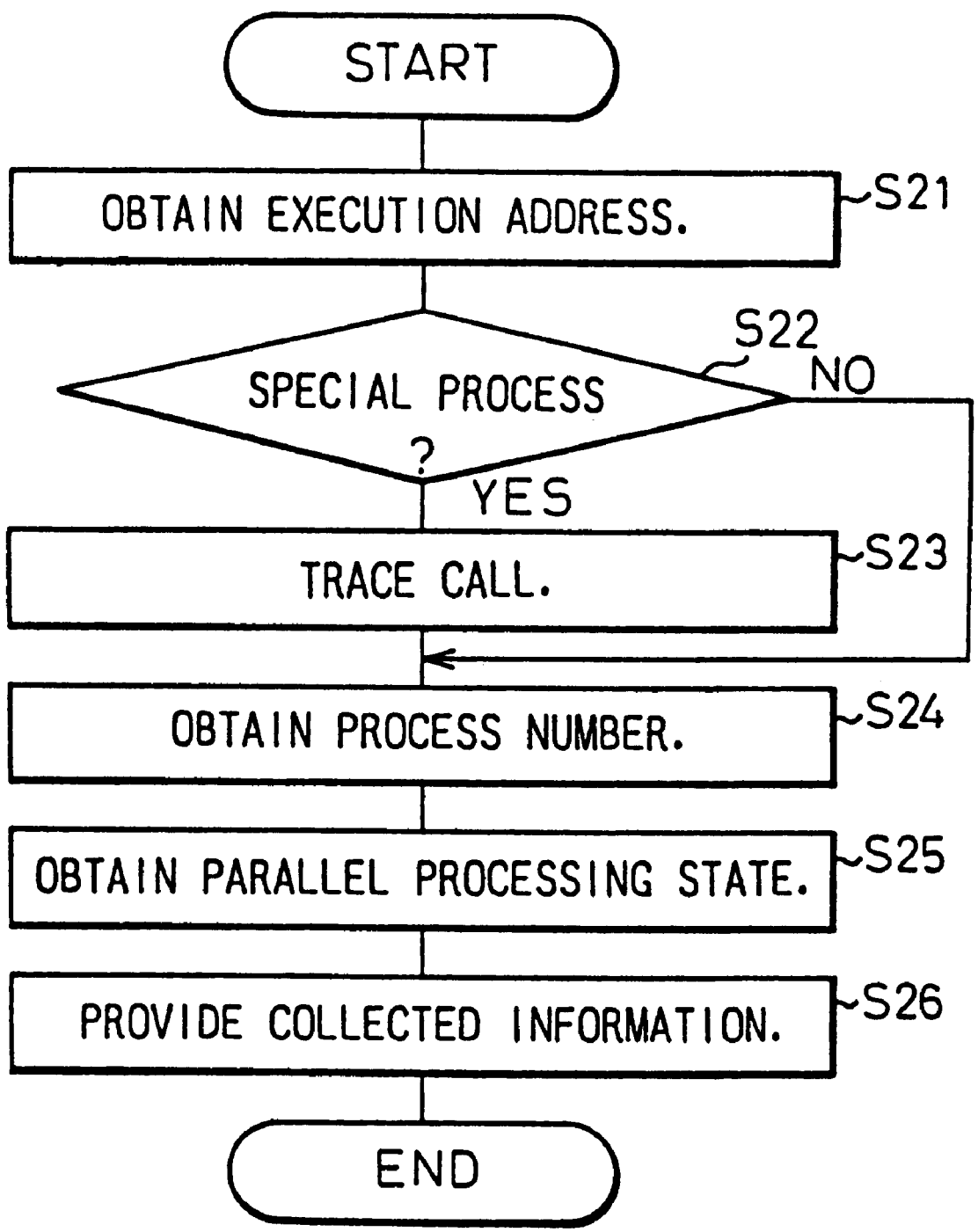
FIG. 7 is a flowchart showing an interrupt routine carried out by the apparatus of the present invention.

FIG. 7 is a flowchart showing the interrupt processing routine (interrupt handler) 42 according to the apparatus of the present invention.

Step S21 obtains an execution address. Step S22 determines whether or not the address relates to a special process. If YES, step S23 is carried out, and if NO, the step S23 is jumped. The step S23 examines a call. Step S24 obtains processor numbers. Step S25 obtains a parallel processing state. Step S26 provides collected information.

Namely, the step S21 obtains an interrupted address. The step S22 determines whether or not the address relates to a routine that requires a special process. This kind of routine is, for example, a synchronization wait library or an asynchronous transfer wait library. If it is one of these kinds of libraries, the step S23 traces the address of the source program that has called the library.

The step S24 obtains processor numbers that are executing the program. The step S25 obtains the parallel processing state. The parallel processing system examined with the apparatus of the present invention involves three program execution states, i.e., a single processing state, a region master state, and a region slave state. These states will be explained later with reference to FIGS. 10 to 12B.

The interrupt routine provides collected information in the step S26. To improve efficiency, the information is stored in the buffer, and when the buffer becomes full or when the program ends, the buffer provides the collected information.

Figure 8:
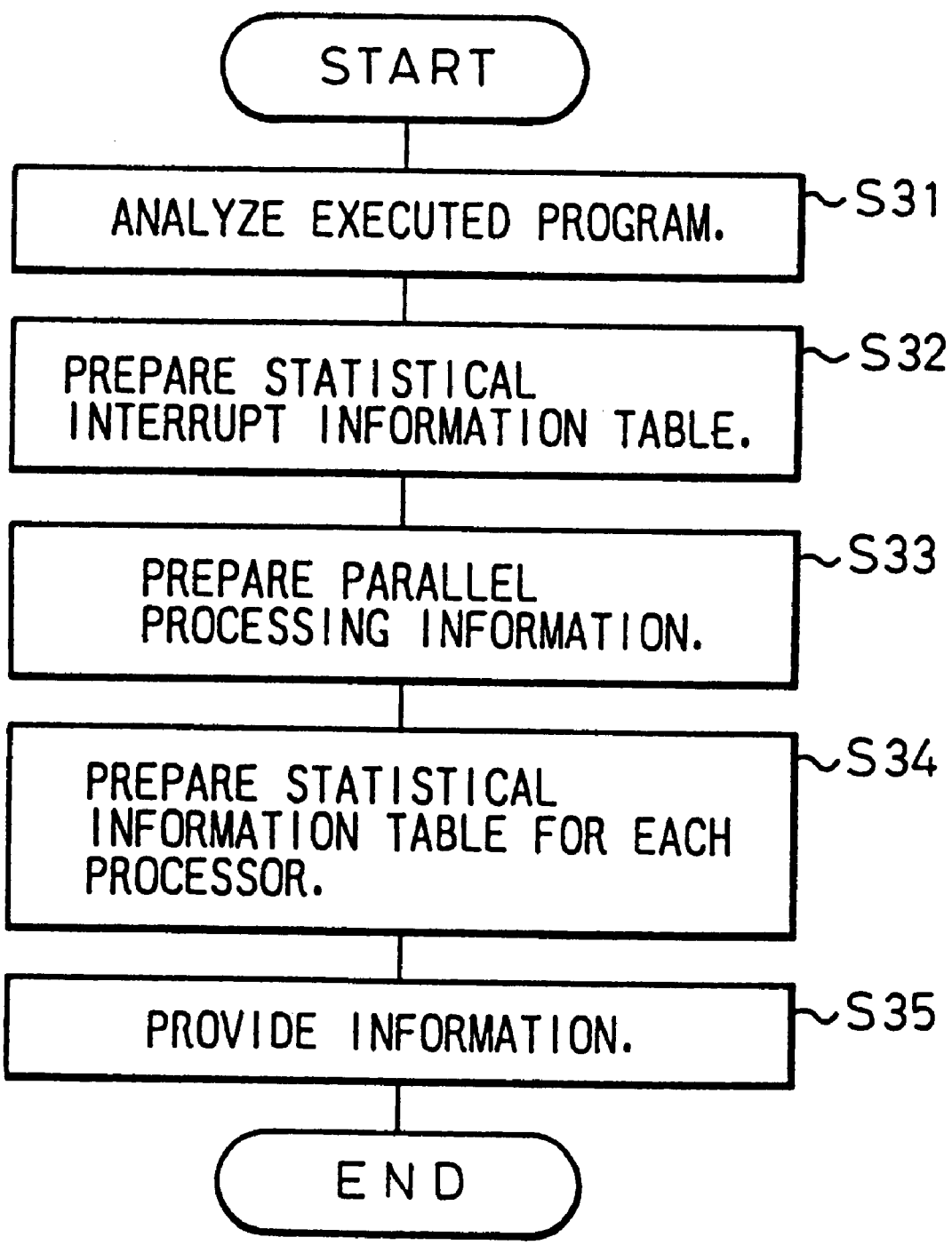
FIG. 8 is a flowchart showing an analysis routine carried out by the apparatus of the present invention.

FIG. 8 is a flowchart showing an analysis routine (the analysis program 8) according to the apparatus of the present invention.

Step S31 analyzes the executable program. Step S32 prepares a statistical interrupt information table. Step S33 prepares parallel processing information. Step S34 prepares a statistical information table for each processor. Step S35 provides these pieces of information.

Namely, the step S31 analyzes the executable program, to obtain start and end addresses of each procedure. For each procedure, the step S32 counts the number of interrupts for each of the single processing state, region master state, and region slave state. According to these pieces of information, the step S33 calculates indices indicating the parallel processing state for each procedure and for the program as a whole. The indices may represent parallelization effect, parallelization ratio, parallel-to-serial speed ratio, load balance, and asynchronous transfer ratio. The step S34 counts the number of interrupts for each procedure and each processor. The step S35 provides these pieces of information.

In this way, this embodiment efficiently provides information about parallel processing, which is useful to develop a parallel processing program.

Figure 9:
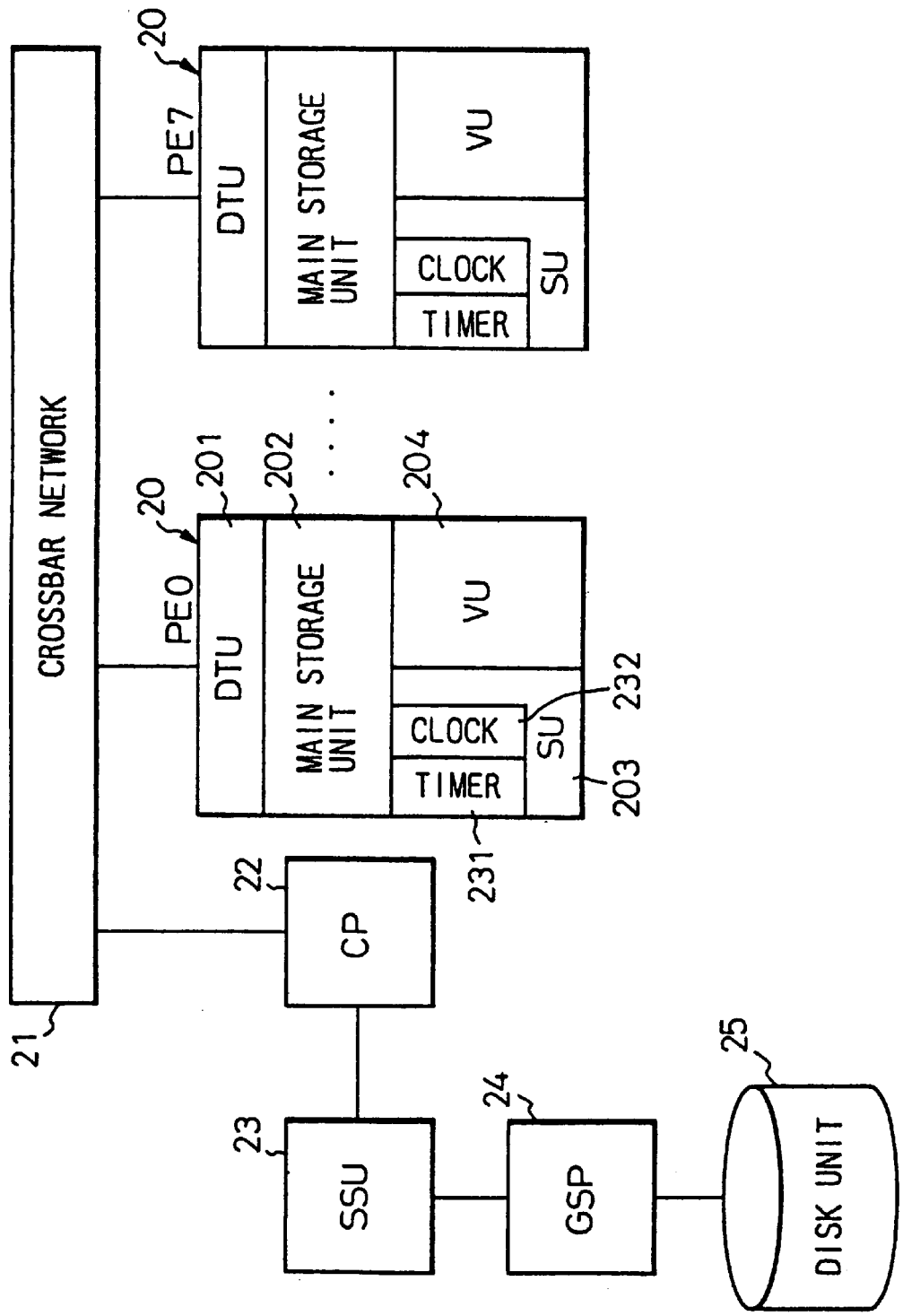
FIG. 9 shows an example of a parallel processing system.

FIG. 9 shows an example of a parallel processing system. The system involves processor elements (PEs) 20, a crossbar network 21, a control processor (CP) 22, a system storage unit (SSU) 23 such as a RAM disk or an external memory, a general system processor (GSP) 24, and a disk unit 25. Each of the processor elements 20 has a data transfer unit (DTU) 201, a main storage unit 202, a scalar unit (SU) 203, and a vector unit (VU) 204. The scalar unit 203 has a timer (an interval timer) 231 for interrupt processing and a clock 232 for providing interrupt time. The general system processor 24 corresponds to the compiler 2 of FIG. 1 and compiles a program. The processor elements 20 actually execute the program.

FIG. 10 shows the operations of the parallel processing system of FIG. 9, and FIG. 11 explains the operations. A reference mark * in FIG. 10 indicates barrier synchronization.

An instruction "PROCESSOR P(8) A" specifies the number of processors to carry out parallel processing. The processor PE0 having an identification number 1 serves as a program master, i.e., a parent processor. The processor PE0 executes a process A of the program. The parallel processing involves, for example, eight processors, i.e., the processor elements PE0 to PE7. These processors have identification numbers 1 to 8, respectively. The processor PE0 having the identification number 1 is the program master. The program master starts and ends the parallel processing.

An instruction "PARALLEL REGION B" starts to execute a process B of the program in parallel. Before this instruction, the program master PE0 executes the process A under a single processing state (a serial processing state). After the instruction "PARALLEL REGION B," the parent processor PE0 and child processors PE1 to PE7 simultaneously execute the process B under a redundant parallel processing state. Starting the parallel processing in response to the "PARALLEL REGION B" corresponds to the step S13 of the flowchart of FIG. 3. Only the parent processor PE0 initializes the measurement library, and the child processors PE1 to PE7 reinitialize the measurement library as shown in FIG. 5.

In the redundant parallel processing state, the processors simultaneously execute the same process B and use processed results as they are in the individual processors. This technique is redundant compared when processing a program with a single processor and transferring a processed result to another processor, but it may sometimes save time. If such a time saving effect is expected, the redundant technique is carried out. When a plurality of processors work on the same region, one (PE0) of the processors serves as a region master and the others as region slaves. A process executed by the region master is under a region master state, and a process executed by the region slaves is under a region slave state.

In response to an instruction "SPREAD REGION /P(1:2) C REGION/P(3:8) D," the processors PE0 and PE1 execute a process C of the program and the processors PE2 and PE7 execute a process D of the program. The process C executed by the processor PE0 is under the region master state, and the process D executed by the processor PE2 is also under the region master state. The process C executed by the processor PE1 is under the region slave state, and the process D executed by the processors PE3 to PE7 is also under the region slave state.

In response to an instruction "END SPREAD E," the processors PE0 to PE7 execute a process E of the program under the redundant parallel processing state. In response to an instruction "SPREAD DO/(P) do 10 i=1, n F," the processors PE0 to PE7 execute processes F1 to F8 of the program, respectively. In this case, the processes F1 to F8 are each under the region master state.

In response to an instruction "END SPREAD G," the processors PE0 to PE7 execute a process G of the program under the redundant parallel processing state. In response to an instruction "END PARALLEL H," the parallel processing ends and only the program master PE0 executes a process H of the program. This "END PARALLEL" corresponds to the step S16 of the flowchart of FIG. 3. Namely, the end process of the measurement library shown in FIG. 6 is carried out only by the program master (which corresponds to the parent processor) PE0.

Figure 12A:
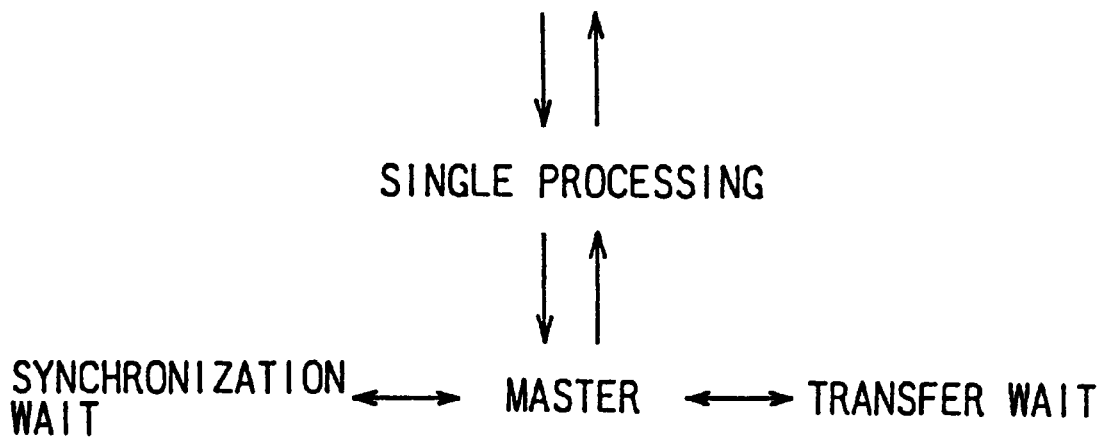
FIG. 12A shows state transition in a parent processor.
Figure 12B:
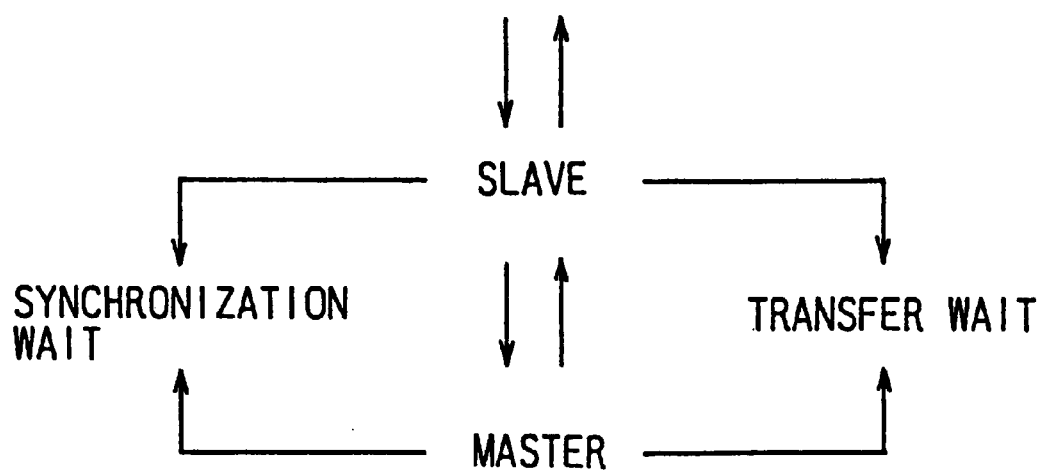
FIG. 12B shows state transition in a child processor.

FIG. 12A shows state transition in the parent processor PE0, and FIG. 12B shows state transition in the child processors PE1 to PE7.

In FIGS. 12A and 12B, a synchronization wait occurs during barrier synchronization. Such a wait frequently occurs when execution time fluctuates depending on regions that are simultaneously processed. The fluctuations are represented as load balance. A transfer wait occurs when a plurality of processors access the same global data.

The apparatus according to this embodiment provides parallel processing library information such as virtual processor numbers, master/slave states, and the number of processors in each region, FORTRAN object information such as calls in a program, hardware information such as vector lengths, OS information such as execution addresses and time, interrupt information such as an asynchronization wait state, a transfer state, and the call originated address of the presently executed library and analytic information such as relationships between executable program addresses and procedures. The FORTRAN object information includes the start address of a wait state traced according to an object obtained from a FORTRAN subroutine. The vector lengths are read out of the vector units 204, and the execution addresses and time are read out of the scalar units 203 and timers 232. Other information is read out of the main storage units 202.

Figure 13:
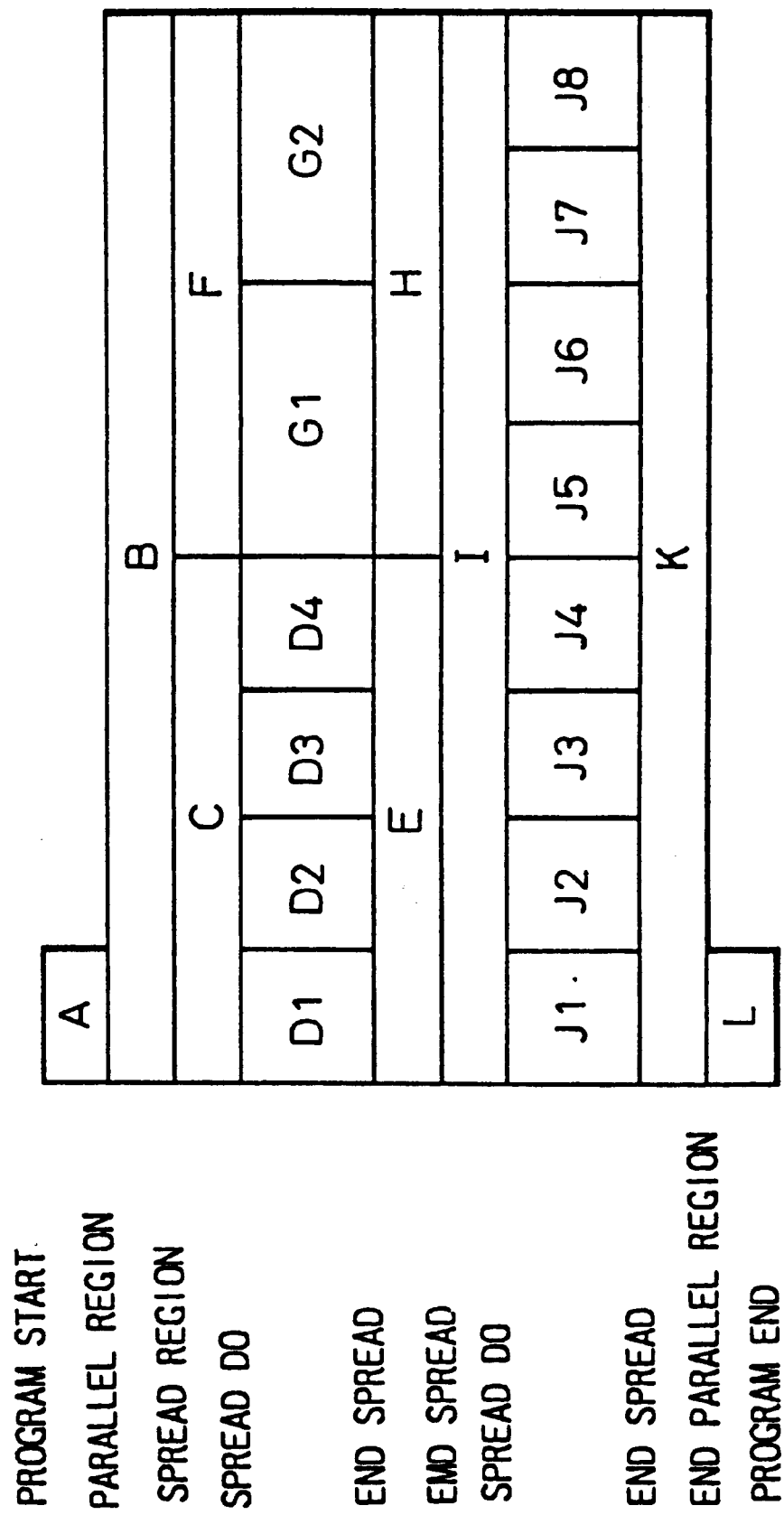
FIG. 13 shows the operations of the parallel processing system of FIG. 9.

FIG. 13 shows the operations of the parallel processing system of FIG. 9 according to the following program:

!XOCL PROCESSOR P(8)
!XOCL PROC ALIAS P1(4)=P(1:4), P2(4)=P(5:8)
  A-PART
!XOCL PARALLEL REGION
  B-PART
!XOCL SPREAD REGION /(P1)
  C-PART
!XOCL SPREAD DO /(P1)
  DO 100 I=1, 4
    D-PART
  100 CONTINUE
!XOCL END SPREAD

```
    E-PART
!XOCL REGION /(P2)
    F-PART
!XOCL SPREAD DO /(P2)
    DO 200 I=1, 2
        G-PART
    200 CONTINUE
!XOCL END SPREAD
    H-PART
!XOCL SPREAD DO/(P)
    DO 300 I=1, 100
        J-PART
    300 CONTINUE
!XOCL END SPREAD
    K-PART
!XOCL END PARALLEL
    L-PART
    STOP
    END
```

This program is written in an extended FORTRAN. The "!XOCL" indicates an extended instruction in extended FORTRAN. A normal FORTRAN compiler processes this code as a simple comment that affects nothing on program execution.

In FIG. 13, parts A and L are not parallel regions, and parts B, I, and K are parallel regions. Parts C and E are in the same region. A part D is made of four regions, a part G is made of two regions, and a part J is made of eight regions. The part A involves an execution period A including a wait time. Other capital letters also represent corresponding execution periods. The part A involves an execution period "a" excluding the wait time. Other small letters also represent execution periods excluding the wait time, except for the parts D, G, and J. A reference mark Di indicates the execution period of a divided part D including a wait time, and a reference mark di indicates an execution period excluding the wait time of the same part. The same is applicable to the parts G and J. Accordingly, $D=\Sigma Di$ and $d=\Sigma di$.

Analytic results provided by the apparatus according to the present invention will be explained. The results involve a parallelization ratio, parallel-to-serial speed ratio, load balance, and parallel execution of transfer and operations.

The parallelization ratio will be explained. The parallelization is equivalent to parts of a program that are simultaneously executed. An index indicating the parallelization is defined as follows:

$$P=Cp/Ca$$

where P is the parallelization ratio, Ca is a total execution period (cost) necessary for executing a program in series, and Cp is an execution period (cost) in which the program is executed in parallel.

To improve the parallelization ratio, parts that involve long execution periods must be executed in parallel. The parallelization ratio P is expressed as follows:

$$P=(c+d+e+f+g+h+i)/(a+b+c+d+e+f+g+h+i+j+k+l)$$

A multiprocessor system involves a redundant processing state in which a plurality of processors operate even if no parallel processing is achieved. A parallelization ratio P' in the multiprocessor system is defined as follows:

$$P'=Cp'/Ca$$

where Cp' is an execution period (cost) for parallel regions. Namely, the parallelization ratio P' in the multiprocessor system is expressed as follows:

$$P'=(b+c+d+e+f+g+h+i+j+k)/(a+b+c+d+e+f+g+h+i+j+k+l)$$

The parts B, I, and K involve each a short execution period, so that the parallelization ratio P' of the multiprocessor system is substantially equal to the parallelization ratio P.

The parallel-to-serial speed ratio will be explained. An important factor for improving parallel processing is the number of processors involved in the parallel processing. If a system employs 100 processors and if only two of them are effectively used to execute a program, the execution of the program is improved only two times even if the program involves many parallel parts. The parallel-to-serial speed ratio is an index to indicate the degree of parallelism.

The parallel-to-serial speed ratio is the ratio of an execution period for simultaneously executing parallel parts of a program to an execution period for serially executing the same parts. If the overhead of the parallel processing is ignorable and if a given number of processors effectively operate, the number of the processors is equal to the parallel-to-serial speed ratio. If the number of processors that are effectively operating changes from time to time, an average (an integration) of the number of processors is used as the parallel-to-serial speed ratio. If the overhead of the parallel processing is ignorable, the parallel-to-serial speed ratio $\beta$ is as follows:

$$1<=\beta<=N$$

where N is the number of processors.

In the multiprocessor system, the parallel-to-serial speed ratio is considered in parallel regions and is expressed as follows:

$$\beta=(B+C+D+E+F+G+H+I+J+K)/(B+MAX(X,Y)+I+MAX(Ji)+K)$$

where $X=C+MAX(Di)+E$ and $Y=F+MAX(Gi)+H$.

The load balance will be explained. In the parallel processing, the balance of the load applied to the processors influences execution performance. During parallel processing, the processors must be synchronized at proper timing to align data. If not particularly specified, the compiler synchronizes the processors at the start and end of a region. If each processor involves a different execution period between the start and end of synchronization, a processor that involves a short execution period must wait for other processors that involve longer execution periods. The shorter the wait time, the better the execution performance.

When N processors operate in a period T between a synchronization point and the next synchronization point, the load balance y is expressed as follows:

$$\lambda=\Sigma W/(N\times T), 0<=\lambda<=1$$

Parallel execution of transfer and operations will be explained. According to the extended FORTRAN, statements such as "SPREAD MOVE" and "OVERLAPFIX" are transfer statements. These transfer statements and a statement "MOVE WAIT" realize asynchronous transfer. In the asynchronous transfer, a program restores control irrespective of the transfer. Accordingly, operations may be carried out between the transfer statement and "MOVE WAIT," to thereby simultaneously achieve the transfer and operations.

If the quantity of data to be transferred is constant, a period for executing the transfer statement is substantially constant. Accordingly, as the operation period between the transfer statement and "MOVE WAIT" becomes longer, the transfer wait time for "MOVE WAIT" becomes shorter.

Namely, the operation period hides the transfer period. If the transfer is complete when executing "MOVE WAIT," the statement "MOVE WAIT" ends at once, and the next part of the program is executed. Namely, the operation period completely hides the transfer. Hiding the transfer with an operation period is very effective to improve the performance of a parallel program executed in a multiprocessor system.

A method of providing parallel processing information and the meaning of the information will be explained with the parallelization ratio P, parallel-to-serial speed ratio $\beta$, load balance ratio $\lambda$, asynchronous transfer ratio M, execution period (cost) Cp of parts of a program where the parallel processing is possible, execution period (cost) Cs of parts of the program where no parallel processing is possible (Ca= Cp+Cs), the number (N) of processors, the number (J) of program master interrupts, the number (R) of region master interrupts, the number (A) of all interrupts, the number (Jw) of program master wait state interrupts, the number (Rw) of region master wait state interrupts, and the number (Rm) of region master transfer wait state interrupts.

The number J of the program master interrupts indicates a period for executing a program and is expressed as follows:

$$J = Cs + Cp/\beta \quad (1)$$

The number R of region master interrupts is the sum of execution periods except redundant portions and is expressed as follows:

$$R = Cs + Cp \quad (2)$$

The number A of all interrupts is expressed as follows:

$$A = Cs + (Cp/\beta) \times N \quad (3)$$

The parallelization ratio P is expressed as follows:

$$P = Cp/(Cs + Cp) \quad (4)$$

If J, R, A, and N are known, the simultaneous equations for Cs, Cp, P, and $\beta$ are solvable. According to the expressions (1) to (4), the parallelization ratio P and parallel-to-serial speed ratio $\beta$ are expressed as follows:

$$P = 1 - (N \times J - A)/(R \times (N-1))$$

$$\beta = ((N-1) \times (R-J))/(A-J) + 1$$

The load balance ratio y is expressed with the ratio of the number Rw of the region master wait state interrupts to the number R of the region master interrupts, as follows:

$$0 <= \lambda = Rw/R <= 1$$

FIGS. 14A and 14B show examples of outputs provided by the apparatus according to the present invention.

The analysis outputs of the apparatus according to the present invention include parallel information, synthesis information, and processor information.

In FIG. 14A, the parallel information involves the parallelization ratio P, parallel-to-serial speed ratio $\beta$, load balance $\lambda$, and asynchronous transfer ratio M. The larger the parallelization ratio P, the greater the parallelization. The larger the parallel-to-serial speed ratio $\beta$, the more effectively the processors are used. The smaller the load balance $\lambda$, the better the load balance. The smaller the asynchronous transfer ratio M, the more the transfer is ignorable compared with operations. FIG. 14B additionally shows the number of processors, performance information, and interval timer values.

The synthesis information shows the counts and percentages of information pieces of all processors for each function. In FIG. 14B, the synthesis information includes the number (PM) of program master interrupts, the number (PMW) of program master wait state interrupts, the number (PMMW) of program master transfer wait state interrupts, the number (RM) of region master interrupts, the number (RMW) of region master wait state interrupts, the number (RMMW) of region master transfer wait state interrupts, the number (ALL) of interrupts in all processors, the number (AW) of wait state interrupts in all processors, and the number (AMW) of transfer wait state interrupts in all processors. These pieces of information are represented with counts and percentages. The same information pieces as those of FIG. 14B are prepared as processor information for each processor.

As mentioned above in detail, the present invention provides an apparatus for efficiently providing information about parallel processing executed in a multiprocessor system.

Many different embodiments of the present invention may be constructed without departing from the spirit and scope of the present invention, and it should be understood that the present invention is not limited to the specific embodiments described in this specification, except as defined in the appended claims.

What is claimed is:

1. A system for analyzing a parallel processing system, the parallel processing system including: multiple parallel processors each interruptible to collect processing status information; and control means for controlling execution of the processors in stages to perform a process in a single one of the processors, to simultaneously perform a same process in several of the processors and to simultaneously perform different processes in the processors; and said system comprising:
   a statistical system determining statistics concerning the stages using status information, comprising:
   a status collection system collecting the status information, including parallel processing library information and parallel processing interrupt information; and
   a statistical analysis system determining statistics about processor executing conditions.

2. A system for analyzing a parallel processing system, the parallel processing system including: multiple parallel processors each interruptible to collect processing status information; and control means for controlling execution of the processors in serial stages to perform a process in a single one of the processors, to simultaneously perform a same process in parallel stages in several of the processors and to simultaneously perform different processes in different stages in the processors; and said system comprising:
   a statistical collection system determining statistics concerning the stages using status information, including parallel processing library information and parallel processing interrupt information; and
   a statistical analysis system determining statistics about processor executing conditions.

3. A system as recited in claim 2, wherein said statistical collection system determines a parallelization ratio and a parallel-to-serial ratio.

4. A system as recited in claim 2, wherein said statistical collection system collects execution condition information.

5. A system as recited in claim 2, wherein said statistical collection system counts a number of parallel processing interrupts.

6. A system for analyzing a parallel processing system, the parallel processing system including: multiple parallel processors each interruptible to collect processing status information; and control means for controlling execution of the processors in serial stages to perform a process in a single one of the processors, to simultaneously perform a same process in parallel stages in several of the processors and to simultaneously perform different processes in different stages in the processors; and said system comprising:

a statistical collection system collecting status information; and a statistical system determining statistics concerning the processor stages responsive to the status information comprising a parallelization ratio, a parallel-to-serial speed ratio, load balance, asynchronous transfer ratio, a number of interrupts for procedures, processors, regions and total, said statistical collection system including a measurement library including interrupts, control procedures, measurement procedures and interrupt handlers.

* * * * *